United States Patent [19]
Ammann, Jr.

[11] Patent Number: 5,724,768
[45] Date of Patent: Mar. 10, 1998

[54] AEROPONIC PLANT GROWTH APPARATUS AND METHOD

[76] Inventor: Paul R. Ammann, Jr., 9 Joline Rd., Kendall Park, N.J. 08824

[21] Appl. No.: 639,552

[22] Filed: Apr. 29, 1996

[51] Int. Cl.[6] .................................................. A01G 31/00
[52] U.S. Cl. .................................... 47/62; 47/63; 47/59
[58] Field of Search ............................... 47/59, 60, 61, 47/62, 62 A, 48.5, 79, 65

[56] References Cited

U.S. PATENT DOCUMENTS

| | | | |
|---|---|---|---|
| 4,216,617 | 8/1980 | Schmidt | 47/62 |
| 4,218,847 | 8/1980 | Leroux | 47/62 X |
| 4,231,187 | 11/1980 | Greenbaum | 47/59 X |
| 4,403,446 | 9/1983 | Wolfe et al. | 47/62 X |
| 4,454,684 | 6/1984 | O'Hare | 47/59 X |
| 4,986,027 | 1/1991 | Harvey | 47/59 |
| 4,991,345 | 2/1991 | Bloch | 47/62 |
| 5,225,342 | 7/1993 | Farrell | 47/62 X |
| 5,440,836 | 8/1995 | Lee | 47/59 X |
| 5,502,923 | 4/1996 | Bradshaw | 47/62 |

*Primary Examiner*—Terry Lee Melius
*Assistant Examiner*—Robert Pezzuto
*Attorney, Agent, or Firm*—Barry R. Blaker

[57] ABSTRACT

Aeroponic plant growing apparatus which includes an elongate vertically oriented plant chamber having a plurality of plant receiving apertures through its side wall. Stationed at the top of the chamber are one or more spray nozzles through which nutrient solution is sprayed into the chamber, thereby wetting the roots of the plants stationed in the apertures. The apparatus includes structure by which fresh atmospheric air is inducted into the chamber and stagnant air is exhausted during the spraying of the plant roots. In a preferred alternative the motive energy for this air induction into the plant chamber is provided by the spray nozzle(s) and an air induction manifold cooperates with the spray nozzle(s) to establish a low pressure Venturi zone therebetween.

14 Claims, 3 Drawing Sheets

500
AEROPONIC PLANT GROWTH APPARATUS AND METHOD

BACKGROUND OF THE INVENTION

The present invention relates broadly to the soilless cultivation of plants and more particularly relates to an improved apparatus and method for the aeroponic cultivation of plants.

Hydroponic growth apparatus, either for decorative purposes in a home or for commercial purposes such as in a greenhouse, are known. Typical of various U.S. patents disclosing such apparatuses are: U.S. Pat. No. 4,033,072, to Kobayashi et al., dated Jul. 5, 1977; U.S. Pat. No. 4,218,847, to Leroux, dated Aug. 26, 1980; U.S. Pat. No. 4,454,684, to O'Hare, dated Jun. 19, 1984; U.S. Pat. No. 4,756,120, to Arledge, dated Jul. 12, 1988; U.S. Pat. No. 4,951,416, to Gutridge, dated Aug. 28, 1990; and U.S. Pat. No. 4,986,027, to Harvey, dated Jan. 22, 1991. In general, according to the article "Hydroponics: Soilless Gardening", appearing in Volume 5 of *New Illustrated Encyclopedia of Gardening*, The Greystone Press, New York, N.Y., 1960, "hydroponic" plant culture can be broadly defined as the cultivation of plants in a soilless media wherein substantially the entirety of nutrients supplied to the plant roots is accomplished by wetting of the plant roots with an appropriate aerated nutrient solution containing, as solutes, the necessary plant nutrients. Thus, the plant roots in hydroponic plant cultures can be supplied by a pool of nutrient solution in which the plant roots are directly immersed or by wetting of a porous inert aggregate material such as sand, gravel, vermiculite, expanded mica, crushed stone, cinders, bricks, glass beads, ground lava and the like and within which aggregate material the plant roots reside. The nutrient solutions utilized in the hydroponic cultivation of plants usually contain solutes comprising not only the primary plant growth elements of nitrogen, potassium and phophorous, but also the micronutrient or trace elements essential to the healthy growth of the particular plant species involved, such as calcium, magnesium, boron, iron, manganese and the like. Additionally, the nutrient solution is often aerated such that the solution applied to the plant roots contains adequate dissolved oxygen to sustain plant growth. Moreover, the $p^H$ of the nutrient solution is normally controlled to within the optimum range for the particular plant species involved. In respect of hydroponic pool systems, one of the methods commonly employed is generally termed as the "flood and drain" method. Here, a horizontally disposed tray containing the roots of the growing plants is cyclically flooded with a nutrient solution. Upon completion of the flood cycle the tray is drained into a recycle receptacle for subsequent recycle of the nutrient solution at the next flood cycle. The drain cycle is an important element of the system since the plant roots, if allowed to remain continuously immersed in the nutrient solution, would be subject to the danger of suffocation. Such "flood and drain" hydroponic systems, due to the physics and geometry of bulk water flow, inherently require that the plants be arranged in a planar array relative to the tray, thereby limiting the number of plants which can be grown per unit surface area thereof.

It has been found that hydroponic plant culture often results in faster plant growth and maturation and greater flower or fruit yields relative to conventional field and greenhouse soil culture methodologies. It is generally theorized that these benefits flow from the fact that, as compared to conventional soil culture methodologies, the plant roots in hydroponic culturing are substantially relieved of the energy-consuming burden of searching and growing through nutrient-poor soils in order to obtain adequate plant nutrition. Thus, in hydroponic plant cultivation, the plant energy normally devoted to root growth is, instead, at least partially made available to the growth and maturation of the plant, thereby resulting in earlier maturation and more prolific flower or fruit yield. In support of this theory it is often found that the root systems of mature flowering or fruiting plants grown hydroponically are substantially shorter or of lesser overall mass than those of similar plants grown in conventional soils.

"Aeroponic" plant culture refers to a sub-genus of hydroponics in which neither a root supportive particulate media nor a root immersion pool of nutrient solution is employed. Instead, in aeroponic plant culture, the plants are generally supported in a vertically oriented elongate chamber whose side wall is perforated with a plurality of plant site apertures to receive the plants and within which chamber the plural plant roots reside suspended, in free space. The foliage of the plants is, of course, stationed exterior of the chamber, thereby to receive light. A nutrient solution is sprayed cyclically or continuously from the top of the chamber, upon the bare plant roots contained therewithin. As in the flood and drain hydroponics system, excess nutrient spray solution may be collected from the bottom of the chamber, any particulate matter filtered and/or settled out therefrom, and recycled to the spray nozzles. Aeroponic plant culture provides a number of advantages over other hydroponic systems. Firstly, no aggregate material is utilized, thereby providing obvious expense, weight, handling and clean-up advantages. Secondly, because the plant roots remain bare, individual plants in an aeroponic system can usually be readily removed with their root systems intact. This becomes a particularly important feature in transplantation or where plant disease or infestation occurs and wherein removal of the entirety of the diseased or pest ridden plants from the system, without residue, is highly desirable. Too, aeroponic cultivation permits arrangement of the growing plants circumferentially and vertically about the root chamber, thereby permitting closer packing of the plant stock and more efficient use of nursery space than is afforded by the aforementioned flood and drain hydroponics system.

In accordance with the present invention, it has now been found that the plant growth and maturation rate advantages generally associated with the hydroponic cultivation of plants over other forms of plant culture can be even further improved in aeroponic systems when atmospheric air is affirmatively inducted into the root chamber of the aeroponic plant growing apparatus and stale air is exhausted therefrom, at least during the period of spraying of the plant roots with nutrient solution.

Beyond the foregoing, however, additional limitations and detriments relating to prior art aeroponic cultivation apparatuses and techniques have also been addressed and resolved in at least certain preferred embodiments of the invention. For instance, in known aeroponic systems, little or no provision is made for the facile removal, replacement and changing of sub-populations of plants whose root systems may have fallen prey to fungal, bacterial, viral or pest infestations or which plants may otherwise have been rendered of lesser quality of growth and maturation than other plants in the system. In accordance with the invention, however, an aeroponic growth system and method is provided wherein plural plants residing within said system may be quickly and conveniently removed, replaced and/or augmented.

OBJECTS OF THE INVENTION

It is a principal object of the present invention to provide novel apparatus for the aeroponic culture of plants.

3

It is another object of the present invention to provide novel apparatus for the aeroponic culture of plants and which apparatus provides an improved root environment therefor.

It is yet another object of the present invention to provide novel segmented apparatus for the aeroponic culture of plants wherein provision is made for the facile removal and/or replacement of sections of plants living within the growing community thereof.

It is still another object of the invention to provide apparatus for the aeroponic culture of plants wherein populations of sickly or infected plants may be effectively entirely removed and/or replaced from the system without leaving behind root elements of said sickly or infected plants.

It is another object of the invention to provide aeroponic plant growth apparatus having improved means for supporting the plants grown therein.

It is yet another object of the invention to provide a novel method for growing plants aeroponically wherein the growth rate, maturation fruit- and/or flower-bearing yields thereof are maximized by control of the environment in which the roots of said plants are maintained.

Other objects and advantages of the present invention will, in part, be obvious and will, in part, appear hereinafter.

SUMMARY OF THE INVENTION

In accordance with the invention there is provided an aeroponic growth apparatus broadly comprising:

(a) an essentially vertically oriented elongate plant chamber defined by a tubular side wall and having upper and lower ends, said side wall comprising a plurality of plant receiving apertures therethrough;

(b) spray means comprising at least one spray nozzle stationed at the upper end of said chamber, said spray means being oriented to direct liquid plant nutrient spray downwardly into the bore of said chamber and to thereby wet plant roots residing therewithin;

(c) means to induct atmospheric air into said chamber and to exhaust stagnant air therefrom during operation of said spray means of (b); and (d) means to deliver liquid plant nutrient solution to said spray means of (b).

In accordance with one preferred embodiment of the apparatus of the invention said plant receiving apertures are each provided with an integral plant supporting unit extending exteriorly therefrom. In another preferred embodiment the plant receiving apertures are staggered helically and vertically about the side wall of the chamber so as to maximize the number of plants which may be grown therein while providing adequate space for the foliage thereof. In still another preferred embodiment the bottom of the chamber is in open fluid communication with a receptacle positioned thereunder, said receptacle acting to collect excess nutrient solution from said chamber and further comprising means to deliver said recovered solution to said spray means.

In accordance with the novel aeroponic plant cultivation method of the invention there is provided an elongate vertically oriented plant chamber defined by a tubular side wall and having plural plant receiving apertures through said side wall. Plural plants are installed in said apertures with the roots thereof suspended within the plant root zone defined by the interior space of said chamber. A plant nutrient solution is sprayed downwardly from the top of the chamber and upon said roots, said spraying being undertaken continuously or, preferably, cyclically. During the course of said spraying of nutrient solution atmospheric air is affirmatively inducted into the plant root zone of said chamber while stagnant air is exhausted therefrom. In a preferred embodiment of the process, excess sprayed nutrient solution is recovered, filtered and the thusly recovered solution recycled to the spraying step.

DESCRIPTION OF THE PREFERRED EMBODIMENT(S)

Figure 1:
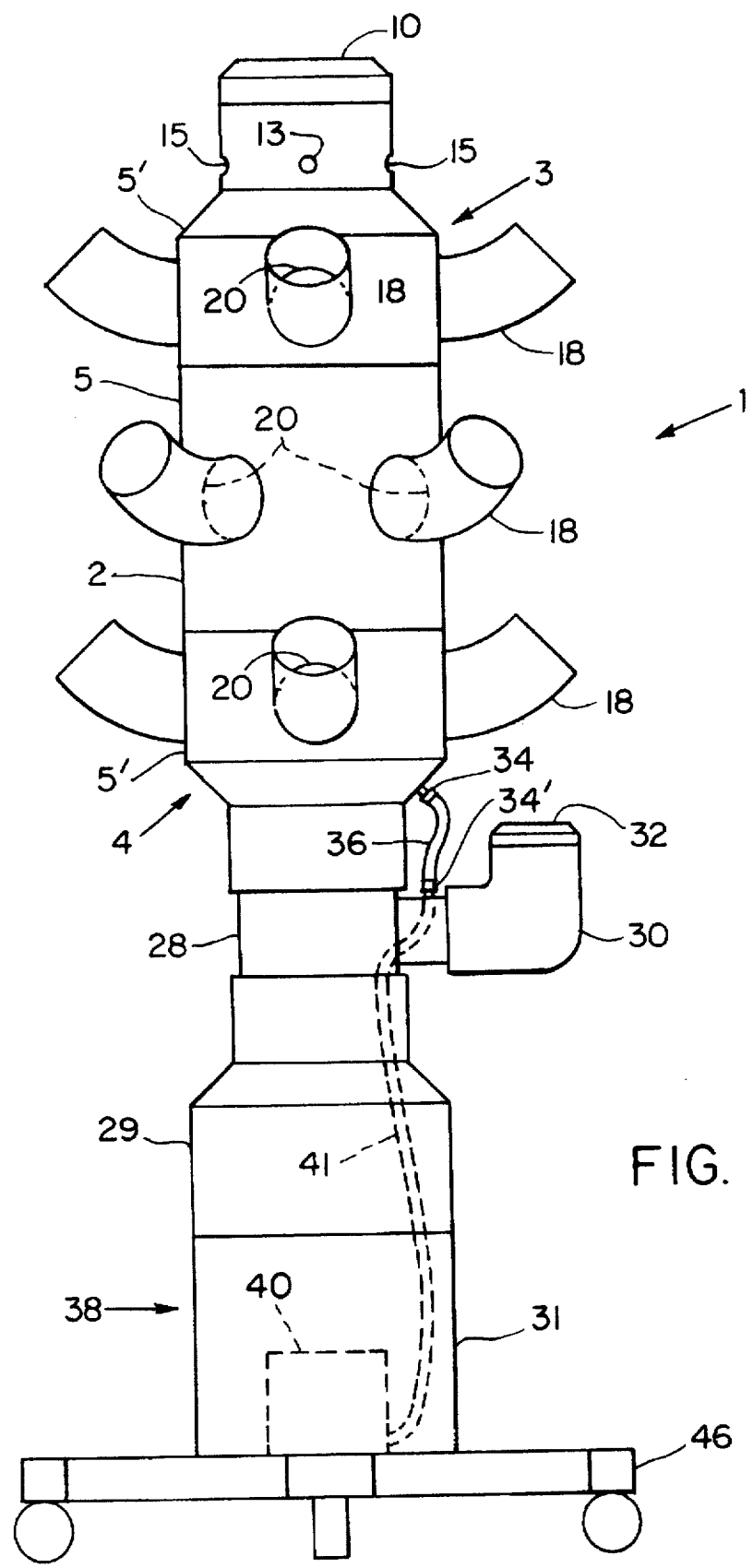
FIG. 1 hereof is a schematic side elevation of an aeroponic plant growth apparatus in accordance with a preferred embodiment of the invention.
Figure 2:
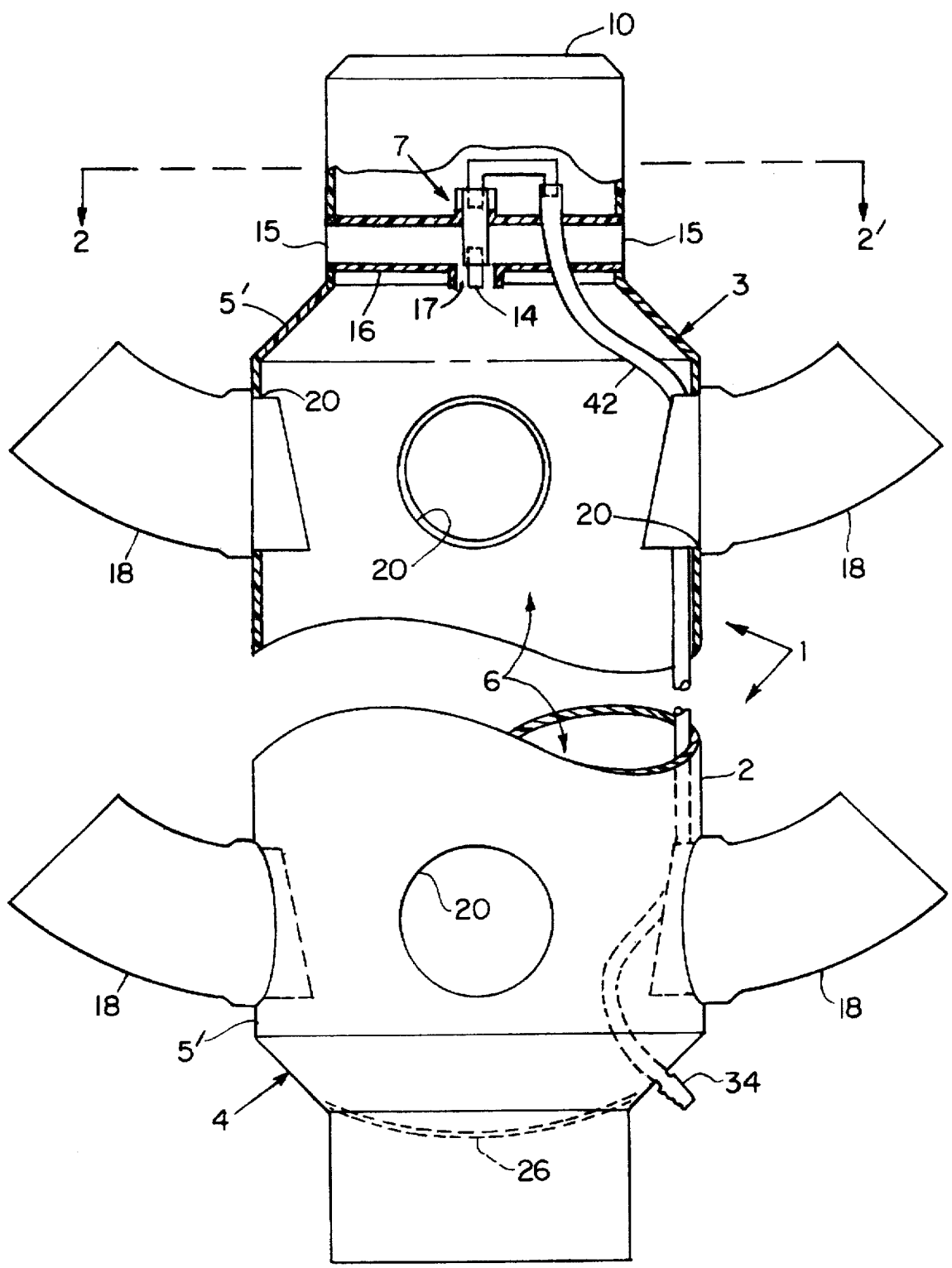
FIG. 2 hereof is an enlarged, partially sectional, side view of certain of the elements of the apparatus of FIG. 1.
Figure 3:
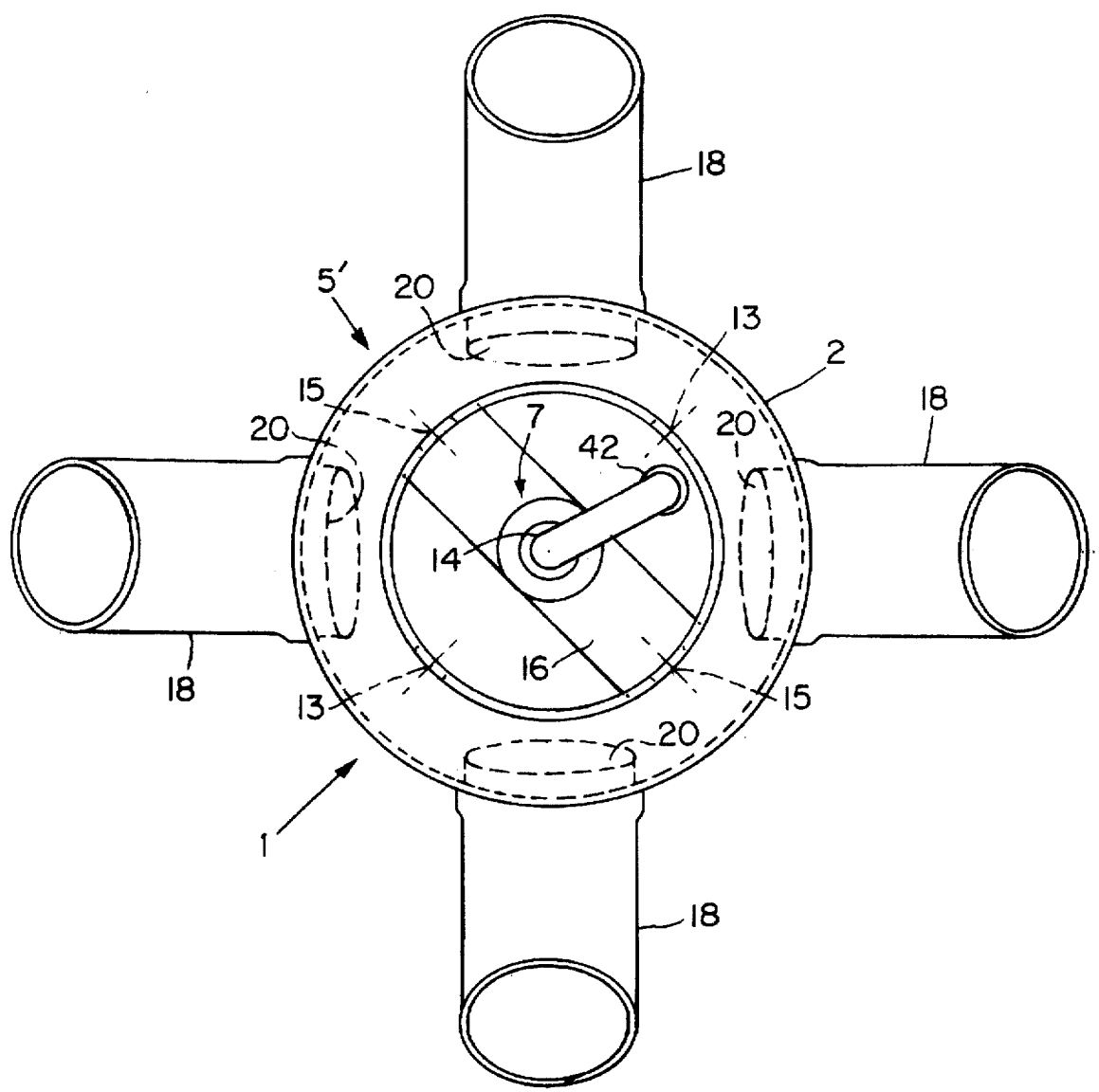
FIG. 3, hereof is a top sectional view of the apparatus of FIG. 2, taken through lines 2—2' thereof.

Referring now to FIGS. 1 through 3, wherein like reference numerals refer to like structures, the apparatus of the invention broadly comprises an essentially vertically oriented elongate plant chamber 1 having a tubular side wall 2 and upper and lower ends 3 and 4, respectively. While said chamber 1 may be of any desired shape, such as in the nature of a jardiniere, I generally prefer that said chamber 1 have an essentially constant cross section throughout its length and that its cross section be of circular or polygonal geometry. With this in mind, I have found that the chamber 1 can generally be readily fabricated from commercially available low pressure plastic pipe elements and fittings. Moreover, the chamber 1 can be made up of plural tubular chamber segments 5, 5' and which segments may be separably stacked or mounted one upon another in order to make up the overall length of said chamber. The provision of this feature of stackability is of great benefit to the user in that it allows for easy adjustment of the overall length of the chamber 1, allows plants to be removed and replaced in the system with great facility and further allows easy transfer of plants from one system to another, should the need or desire arise. It also substantially facilitates assembly and take down of the apparatus and cleansing of the interior of the chamber 1.

As can best be seen in FIG. 2, the side wall 2 of plant chamber 1 comprises a plurality of plant receiving apertures 20 therethrough. Preferably, said apertures 20 are arranged in spaced array about the circumference of each tubular chamber segment 5 or 5', as the case may be, such that when said chamber segments are united, as in FIG. 1, the resulting arrangement of said apertures 20 in the chamber 1 are in a helically and vertically staggered array. Said staggered arrangement of the apertures 20 tends to maximize the number of plants which can be grown in the chamber 1 while providing adequate exterior space to handle the foliage of said plants as they grow to maturity. In addition, said arrangement also tends to cause the foliage of the growing plants to effectively obscure the chamber 1, thereby contributing to the overall attractiveness of the planting.

In another preferred embodiment, each plant receiving aperture 20 is provided with an integral plant supporting element 18 extending exteriorly of the side wall 2. It is the role of said plant supporting element 18 to support the stem of the plant during its growth and, desirably, to urge the plant to maximally present its foliage to light. Where the chamber 1 is comprised of low pressure plastic pipe and fitting elements. I have found that one type of effective supporting element 18 takes the form of a plastic 45° el plumbing fitting solvent welded to the corresponding aperture 20 such that the interior leg of the fitting extends generally horizontally and exteriorly of the side wall 2 and the exterior leg of the fitting extends upwardly and exteriorly of the interior leg. Beyond this, such 45° el plumbing fittings are commercially available in which the juncture between the interior and exterior legs of the el is radiused so as to smoothly transition from one leg to the other thereof. Such smoothly radiused els are preferred in the apparatus of the invention because they ease the placement and removal of plants from the plant receiving apertures 20 without substantial damage to the root systems thereof.

The upper end 3 of said chamber 1 is preferably closed to the exterior atmosphere by means of a closure member 10. Said closure member 10 serves to preserve the humidity within the bore 6 defined by the tubular side wall 2 of the the chamber 1. In turn, said bore 6 constitutes the plant root receiving zone of the apparatus within which the plant roots of the plants received into the apertures 20 are suspended throughout the growth and maturation of the plants.

Further, the upper end 3 of the plant chamber 1 comprises spray means 7 stationed thereat, which spray means 7 includes at least one spray nozzle 14 adapted to receive and spray plant nutrient solution downwardly into the bore 6 of the chamber 1, thereby to wet the roots of those plants residing within the apertures 20 of the plant chamber 1 with said solution. Obviously, depending upon the geometry and dimensions of said chamber 1, said spray nozzle(s) 14 can be singular or plural in number in order to effectively achieve the above result. Said spray nozzle(s) 14 can be of the known pressure, bi-fluid or spinning disk types and, while it is preferred that the spray effluent therefrom be in the fineness of a mist or aerosol, the fineness of the spray effluent is not a limitation in the present invention, it being sufficient that the resulting spray from said nozzle(s) 14 wet the roots of all plants suspended within the plant root chamber 1.

The present invention includes means by which to deliver nutrient solution to the spray means 7. Said delivery means may be entirely external to the apparatus of the invention, such as in the nature of a pump, not shown, receiving nutrient solution from an external source and delivering same to the spray nozzle(s) 14 of the apparatus through appropriate tubular fluid commication(s) thereto or, more preferably, will be internal to the apparatus of the invention. In this regard, it is preferred that the lower end 4 of the plant chamber 1 be in open fluid communication with a collection receptacle 38 disposed thereunder and to which collection receptacle 38 the plant chamber 1 is detachably connected, such as through downspout 28. The collection receptacle 38 comprises a fluid receptacle 31 having a cover 29 detachably secured thereto, the latter of which may take the form, for instance, of an expansion coupling 29. Disposed across the lower end 4 of the chamber 1 is filtration screen 26 which serves to filter solid matter from the excess nutrient solution spray received from the plant chamber 1 and which screen 26 passes said thusly filtered excess nutrient solution into the collection receptacle 38 through downspout 28, cover 29 thence into the fluid receptacle 31. Collection receptacle 38 contains not only the excess nutrient solution spray collected from the plant chamber 1, but also make-up fresh nutrient solution which may be admitted through a fill port 30 which is in fluid communication with downspout 28. Desirably, the fill port 30 is transparent, thus also serving as a sight port for viewing the level of nutrient solution contained in the collection receptacle 38 and, further, comprises a removable cap 32 by which to avoid entry of undesired materials into the receptacle 31 and to prevent excess liquid evaporation therefrom. The collection receptacle 38 further includes a suitable electrically operated pump 40, shown in phantom, which may be mounted within the fluid receptacle 31 and which pump 40 is in fluid communication with the nozzle(s) 14 of chamber 1 such as through serially connected hoses 41, 36 and 42, respectively. Said pump and the tubular communication provided said hoses thus serve as the prime means by which to supply nutrient solution from the collection receptacle 38 to the spray means 7 of the apparatus of the invention. In this manner, the apparatus of the invention is rendered self-contained, thus avoiding the complexities and expense involved in providing external means for providing the nutrient solution to the spray means 7. Moreover, the relatively heavy mass provided by the collection receptacle 38, pump 40 and its liquid nutrient contents serve beneficially to physically stabilize the plant chamber 1 detachably secured thereon.

In the above preferred construction of the invention it is further preferred to provide means by which the fluid communication between the liquid nutrient supply means of the collection receptacle 38 and the spray means 7 of the detachable plant chamber 1 may be conveniently disconnected and connected for such removal and reassembly of the plant chamber 1 to the collection receptacle 38 as may be found necessary or desirable. In the apparatus of FIGS. 1 and 2 said means is provided by a pair of externally and internally exposed hose barbs 34, 34' the interior end of barb 34' being mounted in fluid communication with the interior of fill port 30 and the interior end of barb 34 being mounted in fluid communication with the bore 6 of the lower end 4 of the plant chamber 1. Interposed between the exteriorly exposed ends of said barbs 34, 34' and establishing fluid connection therebetween is a hose section 36 which, due to its placement exterior of the apparatus, may be readily detached and/or reattached at one or the other of its ends from either of the barbs 34, 34' thereby facilitating assembly and disassembly of the plant chamber 1 to and from the collection receptacle 38. The interior end of the barb 34 associated with the plant chamber 1 is connected to tubular hose communication 42 supplying spray means 7 while the interior end of the barb 34' associated with the fill port 30 is connected to the hose 41 communicating with the discharge of the nutrient liquid supply pump 40 mounted within the receptacle 31.

In another preferred embodiment of the invention the plant chamber 1 and, if present, the collection receptacle 38 to which said chamber 1 is detachably secured, are mounted on a castered dolly 46, thereby to provide facility in moving the aeroponic apparatus and/or in rotating same such as to adjust the plants growing therein with respect to prevailing incident light conditions.

A vital element in the apparatus of the invention and its method is the provision of means by which atmospheric air, i.e. ambient air from the external atmosphere, is affirmatively inducted into the bore 6 of plant chamber 1 during operation of said spray means 7 while stagnant air is exhausted therefrom. Any suitable apparatus for carrying out these dual functions can be employed, such as an electrically powered blower or fan stationed at the upper end 3 of the chamber 1 and which fan or blower is adapted to receive atmospheric air and introduce it into the bore 6 during nutrient solution spray operations while stagnant air from within the bore 6 is exhausted, such as through exhaust holes or apertures provided at or near the bottom 4 of the chamber 1. However, in the interests of simplicity of equipments and conservation of energy I much prefer that the air induction and exhaustion scheme utilized in the invention be passive in nature and utilize the motive energy provided by the flow of liquid through the spray nozzle(s) 14. Accordingly, as shown in FIGS. 1–3 hereof and with particular reference to FIGS. 2 and 3, in a preferred embodiment of the invention the nozzle 14 is of the bi-fluid or pressure type and the means utilized to induct fresh atmospheric air from the external environment into the bore 6 comprises a tubular element 16 defining an air induction manifold which is transversely disposed across the upper end 3 of chamber 1 and the ends of which tubular element 16 are in open communication with the external atmosphere through inlet apertures 15. Spray nozzle 14 is centrally mounted through the upper surface of said tubular element 16. Located on the bottom surface of said tubular element 16 is an aperture 17 which surrounds and is suitably spaced from the discharge end of spray nozzle 14 so as to define an annular low pressure Venturi zone therebetween. Thus, flow of liquid nutrient solution from the nozzle 14 during the nutrient spray cycle results in the creation of a low pressure zone in the region of the aperture 17 whereby atmospheric air is inducted through said apertures 15 into the tubular element 16 and is then projected downwardly into the bore 6 through the aperture 17. Exhaust of stagnant air from the bore 6 is achieved during the nutrient solution spray cycle by means of apertures 13 communicating with the exterior atmosphere through the material of the upper end 3 of the chamber 1 and in a plane which substantially corresponds to the plane of the atmospheric inlet apertures 15. Thus, as fresh atmospheric air is introduced into the bore 6 through inlet apertures 15 during the nutrient solution spray cycle, the volume of stagnant air as may have previously existed within said bore 6 is exhausted to the exterior atmosphere through apertures 13 by displacement of the previously existing stagnant air mass by the thusly introduced fresh atmospheric air.

In accordance with the aeroponic plant growing method of the present invention utilizing the apparatus hereof, plants are stationed within the plural apertures 20 of the elongate plant chamber 1, the roots of said plants being suspended within the bore 6 while the plant foliage is positioned exteriorly of the plant chamber 1. Having thus been positioned, the spray means 7 is activated such as to wet the plant roots contained within the bore 6 with a suitable plant nutrient solution. During the time of said spraying of the plant roots with said nutrient solutionj. affirmative induction of fresh atmospheric air into the bore 6 of the plant chamber 1, along with concomitant exhaustion of stagnant air therefrom, takes place. While the wetting of said plant roots by spray means 7 can generally be undertaken continuously throughout the daylight when plants actively grow, respire and mature, it is generally desirable that said wetting of the plant roots by said spray means 7 be undertaken cyclically with a rest period interposed between said wetting cycles. While the durations of the spray and rest periods in these preferred cyclic operations are subject to considerable variation and are at least somewhat affected by such considerations as the ambient temperature and relative humidity, I have generally found that use of nutrient solution spray cycles in accordance with the method of the invention of up to about 15 minutes in duration and with rest cycles of up to about 45 minutes interposed therebetween constitute effective root wetting/rest cycles within which the methodology of the present invention may be effectively practiced and the benefits thereof realised.

Utilizing the above precepts of construction and operation I have successfully aeroponically grown various vegetable plants, such as various tomato and pepper species, to bountiful yields in apparatuses which, unless expressly noted below, were of the type depicted in the drawings hereof and described above. Each said apparatus comprised an elongate plant chamber 1 of circular cross section, having an essentially uniform bore 6 diameter of about 6 inches and being composed of a vertically stacked array of four tubular segments 5, 5', each said segment 5 or 5', as the case may be, being composed of polyvinylchloride pipe and suitable coupling fittings, having an overall length of 6 inches and having five plant apertures 20 arranged radially about the circumference thereof. Each said plant aperture 20 additionally comprised a plant supporting element 18 in the nature of an arcuately shaped tubular polyvinychloride 45° el solvent welded to and extending outwardly and upwardly therefrom. In the assembled state, the resulting twenty apertures 20 of the chamber 1 were conformed into a vertically and helically staggered array. A single pressure-operated full cone spray nozzle 14, having a rated spray capacity of 1.4 gal./minute @10 p.s.i. and an included spray angle of about 120°, was directed downwardly and centrally into the top of the bore 6 of said chamber 1, said nozzle being a Model 1/4 HHPVC14W, manufactured by Spraying Systems Company of Wheaton, Ill. The nozzle 14, whose discharge end had an outside diameter of ½ inch, was mounted into the center of the upper surface of a tubular manifold element 16 composed of a straight section of ½ inch I.D. polyvinychloride pipe transversely disposed across a diameter of the uppermost segment 5'. The respective ends of said manifold element 16 were established in open communication with the external atmosphere through a pair of diametrically opposed inlet apertures 15, each of ½ inch diameter. Essentially coplanar with respect to said inlet apertures 15 and disposed on a diameter of the uppermost segment 5' 90° thereto were two diametrically opposed exhaust apertures 13, each said aperture 13 being of ½ inch diameter. The discharge end of said nozzle 14 was centrally directed through an aperture 17 located in the bottom surface of the manifold element 16, said aperture 17 having a diameter of ⅝ inch, thereby providing an annular low pressure Venturi zone of about 1/16 inch between said aperture 17 and the discharge end of said nozzle 14. The nozzle 14 was supplied with a nutrient solution by means of an electrically powered submersible pump 40 contained within the receptacle 38 to which the chamber 1 was detachably affixed. The pump was a Model NK-1, manufactured by Little Giant Pump Company, of Oklahoma City, Okla. and which pump 40 had a rated capacity, at open discharge, of 210 gallons/per/hour. Fluid communication between the discharge of said pump 40 and said nozzle 14 was achieved by serially connected ½ inch I.D. hoses 41, 36 and 42, respectively. A timer was interposed between the pump 40 and its electric power source, thereby to provide the capability to operate the pump cyclically, at timed intervals.

In operations of the above-described apparatuses seedling plants were initially installed in each apparatus through each of the twenty plant support elements 18 thereof and into said apertures 20, the roots of said plants thus being suspended within the bore 6. Then, by appropriate setting of the timer the roots of the thusly disposed growing plants were cyclically wetted during the daylight hours throughout the length of their growth and maturation by spraying of said nutrient solution through the spray nozzle 14 for a spray period of 15 minutes, followed by a rest period of about 45 minutes. Affirmative induction of atmospheric air into the bore 6 during the spray periods was demonstrated by holding a lighted candle near each of the air induction inlet apertures 15 and noting that the candle flame and its smoke were inducted thereinto. Using this candle demonstration technique the exhaustion of stagnant air from the bore 6 during said spray periods was similarly noted.

While the foregoing description demonstrates certain preferred embodiments of the apparatus of the present invention and of techniques for the implementation and use thereof it should be noted, recognized and understood that said description is not to be construed as limiting in nature because many obvious changes, modifications and variations may be made in the above description of the apparatus and method without departing from the essential scope, spirit or intention of the invention. For instance, while the plant chamber 1 and/or the collection receptacle 38 of the above-described apparatus have each been hereinbefore particularly described as desirably being composed of a plastic material, it is obvious that one, the other, or both of said elements of the invention can also be composed of a ceramic, metallic or any other material suitable to the intended tasks thereof. Moreover, the plant chamber 1 need not be of circular cross section and need not be of constant cross section throughout its length. Also, the air induction manifold need not take the specific form of the tubular element 16 described above, it being obvious that many alternative forms of such air induction manifolds will suggest themselves to those of ordinary skill in the art of fluidics and, further, that the specific design of such manifolds may also be dictated by the use of multiple nozzles 14. It will also be obvious that the active element to induct atmospheric air and exhaust stagnant air from the bore 6 need not be stationed at the induction side of the apparatus of the invention. For instance, said element can also be in the nature of an exhaust fan or blower stationed externally of the exhaust side of the arrangement, thereby to draw fresh air into the bore 6 through a suitably disposed air induction inlet while drawing stagnant air through the exhaust outlet thereof. Accordingly, it is intended that the invention is to be limited only by the scope of the appended claims.

What is claimed is:

1. Aeroponic plant growing apparatus comprising:
   (a) an essentially vertically oriented elongate plant chamber having upper and lower ends and a tubular side wall, said chamber having a bore defining a plant root receiving zone and said side wall comprising a plurality of plant receiving apertures therethrough;
   (b) spray means comprising at least one spray nozzle stationed at the upper end of said plant chamber, said spray means being oriented to spray liquid plant nutrient solution downwardly through the bore of said chamber, thereby to wet plant roots residing within said zone;
   (c) means to supply liquid plant nutrient solution to said spray means; and
   (d) means to induct atmospheric air and to exhaust stagnant air from said chamber during operation of said spray means.

2. Aeroponic plant growing apparatus in accordance with claim 1 wherein said means to induct atmospheric air into said chamber comprises an air induction manifold in open communication with atmospheric air, said manifold being conformed and arranged with respect to said at least one spray nozzle so as to establish a Venturi effect low pressure zone therebetween, whereby operation of said at least one nozzle induces flow of atmospheric air into said chamber through said manifold.

3. Aeroponic plant growing apparatus in accordance with claim 1 wherein said essentially vertically oriented elongate chamber comprises a plurality of tubular segments separably mounted one upon the other.

4. Aeroponic plant growing apparatus in accordance with claim 1 comprising plant supporting means integral with and extending exteriorly of each said plant receiving aperture.

5. Aeroponic plant growing apparatus in accordance with claim 4 wherein each said plant supporting means is in the nature of a tubular 45° el having an interior leg extending generally horizontally and exteriorly of the plant receiving aperture associated therewith and an exterior leg extending upwardly and exteriorly of said interior leg.

6. Aeroponic plant growing apparatus in accordance with claim 5 wherein the juncture between the interior and exterior legs of each said el is arcuate.

7. Aeroponic plant growing apparatus in accordance with claim 1 wherein the bottom end of said chamber is in fluid communication with a collection receptacle disposed thereunder, said receptacle thereby collecting excess sprayed nutrient solution therefrom.

8. Aeroponic plant growing apparatus in accordance with claim 7 wherein said collection receptacle includes means to supply nutrient solution therefrom to said spray means.

9. Aeroponic plant growing apparatus in accordance with claim 8 wherein said supply means comprises a pump housed within said collection receptacle and a tubular communication between said pump and said spray means.

10. Aeroponic plant growing apparatus in accordance with claim 7 wherein said elongate chamber is removably secured to said collection receptacle.

11. Aeroponic plant groving apparatus in accordance with claim 7 wherein said collection receptacle is mounted on a castered dolly.

12. Aeroponic plant growing apparatus in accordance with claim 1 wherein said elongate chamber is of circular cross section.

13. Aeroponic plant growing apparatus in accordance with claim 1 wherein said elongate chamber is of polygonal cross section.

14. Aeroponic plant growing apparatus in accordance with claim 1 wherein said plurality of plant receiving apertures are arranged in a helically and vertically staggered array about the side wall of said plant chamber.

* * * * *